United States Patent Office 3,332,749
Patented July 25, 1967

3,332,749
CARBONYL COMPOUNDS CONTAINING IRON AND COBALT AND PROCESS FOR PRODUCING SAID COMPOUNDS
Giulio Natta and Paolo Chini, Milan, Italy, assignors to Montecatini Edison S.p.A., Milan, Italy
No Drawing. Filed June 20, 1960, Ser. No. 37,037
Claims priority, application Italy, June 23, 1959, 10,606/59
21 Claims. (Cl. 23—315)

This invention relates to a new class of metallocarbonyl compounds included in the general Formula A $$R[FeCo_3(CO)_{12}]_n \quad (A)$$

in which R is a cationic substituent and $n$ is the valence of R. The invention is further directed to a process for preparing compounds having said general Formula A.

The new class consists of metallocarbonyl compounds derived from the anion grouping $[FeCo_3(CO)_{12}]$ and the hydrocarbonyl derived from the same anion, namely, $HFeCo_3(CO)_{12}$.

Metallocarbonyl and hydrocarbonyl compounds in which the carbon monoxide is bound to one or more atoms of the same element are already known.

The known hydrocarbonyl compounds have outstanding catalytic properties, but their practical application is hampered because they are unstable and decompose at room temperature or lower. Moreover, some of them, e.g. $H_2Fe(CO)_4$ and $HCo(CO)_4$, have high volatility and toxicity.

We have, surprisingly, found a new class of metallocarbonyl compounds which have significant advantages for use as catalysts, and are also able to supply the group $HFeCo_3(CO)_{12}$. The latter hydrocarbonyl group, in contrast to the hydrocarbonyl compounds already known, decomposes at a much higher temperature than room temperature and, due to its low volatility, can be handled without taking special precautions.

Whereas, in the previously known metallocarbonyl compounds, the carbon oxide always was bound only to metal atoms of the same element, in contrast, in the new metallocarbonyl compounds, derived from the anion $[FeCo_3(CO)_{12}]^-$, the carbon monoxide is bound to different metals, and the anion $[FeCo_3(CO)_{12}]^-$ acts as an unsplittable unit.

For instance, some of the known compounds, such as nickelhexaminocobaltocarbonyl, $[Ni(NH_3)_6][Co(CO)_4]_2$, or nickelhexaminotetraferrocarbonyl, $$[Ni(NH_3)_6][Fe_4(CO)_{13}]$$

when in solution yield anions containing only a single metal. Thus, by treating the latter compounds with a sodium sulfide solution, it is possible to precipitate all the nickel, and to obtain a solution of $Na[Co(CO)_4]$ or of $Na_2[Fe_4(CO)_{13}]$, respectively. In contrast, by treating a solution of a metallocarbonyl compound included in the general Formula A, e.g. by treating ferrotricobaltocarbonyl of cobalt hexahydrate, $[Co(H_2O)_6][FeCo_3(CO)_{12}]_2$, with sodium sulfide, only the cationic cobalt is precipitated, which precipitate is obtained in an amount that is one-seventh of the initial total cobalt content. In this case an aqueous solution is obtained containing the compound $Na[FeCo_3(CO)_{12}]$.

The compounds comprised in general Formula A are thus a new and unexpected species of mixed carbonyl compounds, having valuable and unexpected properties.

A further object of the present invention is to devise advantageous methods of preparing mixed carbonyl compounds comprised in the general formula $$R[FeCo_3(CO)_{12}]_n$$

wherein R is a cationic substituent selected, for example, from the group consisting of $H^+$, $Li^+$, $Na^+$, $K^+$, $N(R')_4^+$, ($R'$=an alkyl, or an aryl radical or a hydrogen atom), $Cu^+$, $Ag^+$, $Au^+$, $Tl^+$, $Co(C_5H_5)_2^+$ (where $C_5H_5$=cyclopentadienyl), $Mg^{++}$, $Ca^{++}$, $Ba^{++}$, $Sr^{++}$, $Zn^{++}$, $Cd^{++}$, $Pb^{++}$, $Sn^{++}$, $Mn^{++}$, $Fe^{++}$, $Co^{++}$, $Ni^{++}$, $Ti^{++}$, $UO_2^{++}$; $Tl^{+++}$, $Cr^{+++}$, $Hg^{++}$. (Said cationic substituent can also be complexed with compounds which are basic according to Lewis.) $n$=valence of R.

The processes are characterized in that initially solutions are prepared containing compounds in which the cationic substituent is cobalt, and which are of the general Formula B $$[Co(B')_y][FeCo_3(CO)_{12}]_2 \quad (B)$$

wherein B' is an organic compound, which is basic according to Lewis, containing oxygen and/or nitrogen, selected from the group consisting of ketones, esters, ethers, alcohols, amines, amides, nitriles, and other organic compounds containing one or more functional groups (i.e. mono- or poly- or heteropoly-functional) of these types, which can be the same or different; $y$ is a number not higher than 6. Successively, said solutions, containing compounds in which the substituent is cobalt, are treated with a compound of the formula XZ wherein X is the desired cationic substituent and Z is an anion which yields with X a strong acid when X is hydrogen; while when X is different from hydrogen, Z is an anion yielding with X a salt which is soluble in the reaction medium.

The method of preparation of compounds containing cobalt as cationic substituent of the general formula $[Co(B')_y][FeCo_3(CO)_{12}]_2$, wherein B' and $y$ have the above-mentioned meaning, is characterized in that a ferrocarbonyl compound is reacted under pressure with carbon oxide, hydrogen and a di- or tri-valent cobalt compound, in the presence of an organic compound containing oxygen and/or nitrogen.

As ferrocarbonyl compound we employ, for example, $Fe(CO)_5$, $Fe_2(CO)_9$, and $Fe_3(CO)_{12}$.

As organic compound containing oxygen and/or nitrogen, a basic substance according to Lewis is used, e.g. a compound selected from the group consisting of ketones, esters, ethers, alcohols, amines, amides, nitriles, and other organic substances containing one or more of the same or different functional groups of these types, or a mixture containing one or more of said compounds.

As cobalt compound, we employ a cobalt compound that is transformable, in the presence of carbon monoxide and hydrogen, into the corresponding cobaltocarbonyl compound. Preferably, we employ a soluble salt, e.g. a salt of a carboxylic acid having 3 or more carbon atoms, or of a beta-diketone, and we carry out the reaction preferably between 20° to 50° C. However, an insoluble compound may also be used, preferably a compound which is reducible by $H_2$ and/or CO, as for instance a basic carbonate, or an hydroxide, or an oxide, the reaction in this case being carried out at temperatures higher than 50° C. and preferably lower than 150° C.

The amount of the carbon monoxide consumed during the reaction is given by the stoichiometric equation in which $R_2$ is taken as explained in the preceding paragraph.

$$7CoR_2 + 2Fe(CO)_n + (24-2n)CO + 7H_2 \xrightarrow{B} [Co(B)_y][FeCo_3(CO)_{12}]_2 + 14RH$$

If a ratio $Co^{(II)}:Fe^{(o)}$ differing from 3.5 is desired, the amount of carbon monoxide is calculated on the basis of that component which is present in an amount lower than the stoichiometric amount.

It is preferable to avoid using an amount of carbon monoxide that is lower than the stoichiometric one, and also a too great excess, since the partial pressure of CO at the end of the reaction has to be such as to avoid the formation of carbonyl compounds containing a higher ratio of CO mols to metal atoms than that of the above indicated compound. The hydrogen is used in excess, under a partial pressure of at least 25 atm.; and the reaction is carried out preferably in the presence of small amounts of preformed $Co_2(CO)_8$.

The preparation can be markedly simplified by using a preformed cobaltocarbonyl compound in the place of di- or trivalent cobalt compound, carbon monoxide and hydrogen. In this case the reaction is carried out at atmospheric pressure and at a temperature between 0° and 100° C. As cobaltocarbonyl compound, it is possible to use $Co_2(CO)_8$, $Co_4(CO)_{12}$ or solutions containing carbonylcobalto-cobaltates having the general formula:

$$[Co(B')_y] [Co(CO)_4]_2$$

where B' and y have the above mentioned meaning.

The reaction can be carried out with an excess or with an amount lower than the stoichiometric amount of ferrocarbonyl calculated in the ratio Co/Fe=3.5.

It is often possible to separate the compounds from the thus obtained solutions in a dry state by a simple evaporation of the solvent under vacuum.

The chemical and physical properties of the compounds comprised in the general Formula A depend on the cationic substituent introduced. For example, the compound $HFeCo_3(CO)_{12}$ is a typical covalent compound, which is soluble in hydrocarbons with a violet color, insoluble in water and is able to sublimate. On the other hand, the compound $NaFeCo_3(CO)_{12}$ is an ionic compound soluble in water with a brown color, insoluble in hydrocarbons and unable to sublimate.

The hydrocarbonyl compound $HFeCo_3(CO)_{12}$ can be crystallized from toluene or from other hydrocarbons, in the form of black-violet crystals which sublimate at 40–60° C. under a pressure of 0.01÷0.2 mm. Hg. The compound is only very slightly attacked by atmospheric oxygen and remains, even after air exposure for several days, partially unaltered. Upon heating under nitrogen said compound begins to decompose at temperatures above 100° C.

The metallocarbonyl compounds comprised in the general Formula A present a typical I.R. spectrum due to the presence of the group $[FeCo_3(CO)_{12}]^-$; said spectrum presents two main adsorption zones; the former consists of different bands around 4.9μ; the latter are around 5.3μ.

The ion $[FeCo_3(CO)_{12}]^-$ is diamagnetic.

The following table illustrates the analytical data of some compounds comprised in general Formula A.

a temperature of only 55° C. in an autoclave having 500 ml. capacity, under an initial pressure of 30 atm. ethylene, 75 atm. CO and 150 atm. hydrogen. After 6 hrs. the total pressure is decreased down to 100 atm., and by further compression of CO, 90% of the introduced ethylene is, after 12 hrs. transformed in propionic aldehyde and other products containing the carbonylic group.

The feasibility of changing the cation that is bound to the carbonylic anion permits one to coordinate, to the complex itself, organic substances containing groups associatable to or with the cationic complex, or containing groups able to substitute, in an unstable way, for the Co groups of the anion. This leads to catalytic reactions which do not take place at all with the already known carbonylic compounds, or only in a less favorable way.

The following examples are illustrative but not limitative.

Example 1

26.93 grams $Co_2(CO)_8$ and 10.34 grams $Fe(CO)_5$ are introduced, under nitrogen, in a 250 cc. flask provided with a magnetic stirrer, a funnel with a stop cock, and a reflux condenser to which a gasholder is connected. 95 cc. of freshly rectified acetone are added to said mixture. An abundant release of carbon monoxide begins, which is collected in the gasholder. After two hours of reactions at room temperature, the mixture is reacted for a period of 7 hours at 40° C., and then boiled under reflux for an additional 6 hours until the carbon monoxide evolvement becomes irrelevant, or slight.

About 7250 N cc. of gas are evolved. The brown liquid in the flask is evaporated by means of a pump and then dried by heating at 50–60° C. under a vacuum of 1 mm. Hg.

The volatile products, recovered by condensing them in a trap kept at −70° C. contain 0.515 g. $Fe(CO)_5$. The ratio between the converted $Co_2(CO)_8$ and $Fe(CO)_5$ is 1.71 (calculated 1.75).

The evaporation residue consists of 39.29 g. of a black-violet dry and crystalline product.

This product corresponds to the formula:

$$[Co(CH_3\text{---}CO\text{---}CH_3)_6][FeCo_3(CO)_{12}]_2$$

and analyzed gives the following data:

|  | Cobalt, percent | Iron, percent | CO N, cc./ 0.1 g. |
|---|---|---|---|
| Found | 26.6 | 7.03 | 35.05 |
| Calculated | 26.75 | 7.57 | 34.8 |

| Compound | Co, percent | | Fe, percent | | Co n, ml./0.1 g. | | K, percent | |
|---|---|---|---|---|---|---|---|---|
|  | Calc. | Found | Calc. | Found | Calc. | Found | Calc. | Found |
| [Co(CH₃—CO—CH₃)₆][FeCo₃(CO)₁₂]₂ | 26.75 | 26.6 | 7.57 | 7.03 | 34.8 | 35.05 | | |
| HFeCo₃(CO)₁₂ | 31.09 | 30.85 | 9.81 | 9.95 | 47.2 | 47.2 | | |
| [N(C₂H₅)₄][FeCo₃(CO)₁₂] | 25.30 | 25.32 | 7.99 | 8.24 | 38.48 | 38.4 | | |
| [K(CH₃OO—CH₃)₁.₅][FeCo₃(CO)₁₂] | 25.45 | 25.2 | 8.03 | 8.09 | 38.70 | 38.5 | 5.62 | 6.18 |

The carbonylic compounds comprised in the general Formula A can be successfully utilized in many synthetic reactions, particularly as catalyst in the hydrocarbonylation of olefins, alkines, diolefines, and other unsaturated compounds. They are utilizable by the same methods and in the same organic syntheses as are the known iron-cobalt-containing carbonylic compounds. Such syntheses are well known to persons skilled in this art, and are readily found in the prior patents, and in prior published chemical literature through a search in the indices of the American or British Chemical Abstracts.

So for instance using as catalyst 6.58 g. of $$[Co(CH_3COCH_3)_6][FeCo_3(CO)_{12}]$$

and 100 ml. acetone as solvent, it is possible to operate at

The designation of the formula $$[Co(acetone)_6][FeCo_3(CO)_{12}]_2$$

is confirmed by Examples 2, 3, 4 and 5.

Example 2

5.225 g. $[Co(CH_3\text{---}CO\text{---}CH_3)_6][FeCo_3(CO)_{12}]_2$, prepared as described in Example 1, are dissolved in 100 cc. deaerated water, and the obtained solution is filtered under nitrogen into a flask containing 50 cc. concentrated HCl.

The precipitate thus formed is filtered under $N_2$ and dried. 3.7 g. $HFeCo_3(CO)_{12}$ are obtained (96% of the calculated). The raw product is purified by sublimation.

|  | Co, percent | Fe, percent | CO N, cc./0.1 g. |
|---|---|---|---|
| HFeCo$_3$(CO)$_{12}$ raw | 30.85 | 9.33 | 46.5 |
| HFeCo$_3$(CO)$_{12}$ sublimated | 30.85 | 9.95 | 47.2 |
| Calculated | 31.09 | 9.81 | 47.2 |

The filtered hydrochloric solution contains 0.1975 g. cobalt, equal to 1/7 of the charged cobalt; iron is present in traces. These data agree completely with the formula designed to the compound prepared as described in Example 1. Further, a sample of compound, when pyrolized at 185° C., evolves a gas-containing hydrogen and carbon oxide in amounts near to the calculated value.

*Example 3*

7.728 g. [Co(CH$_3$—CO—CH$_3$)$_6$][FeCo$_3$(CO)$_{12}$]$_2$, prepared as described in Example 1, are dissolved in 100 cc. deaerated water and the obtained solution is filtered under nitrogen into a flask containing a solution consisting of 3.1 g. of [N(C$_2$H$_5$)$_4$]I in 50 cc. water. The brown product thus obtained, is filtered and dried under vacuum and then is purified by dissolving it in acetone; by filtering and by evaporating acetone. The dark-brown, crystalline product amounts to 6.85 g. (98.5% of the calculated).

ANALYSIS

[N(C$_2$H$_5$)$_4$] [FeCo$_3$(CO)$_{12}$]

|  | Co, percent | Fe, percent | CO N, cc./0.1 g. |
|---|---|---|---|
| Found | 25.32 | 8.24 | 38.4 |
| Calculated | 25.30 | 7.99 | 38.48 |

The solution obtained from the filtration contains 0.2850 g. of cobalt equal to one-seventh of the initial amount; iron is present in traces. This data also confirms the formula designated for the compound prepared in Example 1.

*Example 4*

5.7 g. [Co(CH$_3$—CO—CH$_3$)$_6$][FeCo$_3$(CO)$_{12}$]$_2$ prepared as described in Example 1, are dissolved in 100 cc. deaerated water and the solution thus obtained is filtered under nitrogen in a solution containing 40 g. CH$_3$COOK in 50 cc. H$_2$O. The solid thus separated is filtered under nitrogen, dried and then purified by dissolving it in acetone, by filtering and by evaporating the acetone.

4.6 g. of a dark-brown crystalline product are so obtained (89% of the calculated).

ANALYSIS

[K(CH$_3$COCH$_3$)$_{1.5}$ [FeCo$_3$(CO)$_{12}$]

|  | K, percent | Co, percent | Fe, percent | CO N, cc./0.1 g. |
|---|---|---|---|---|
| Found | 6.18 | 25.2 | 8.09 | 38.5 |
| Calculated | 5.62 | 25.45 | 8.03 | 38.70 |

*Example 5*

6.697 g. [Co(CH$_3$—CO—CH$_3$)$_6$][FeCo$_3$(CO)$_{12}$]$_2$ prepared as described in Example 1, are dissolved in 330 cc. deaerated water and filtered under nitrogen in a solution of 1.75 g. HgCl$_2$ in 50 cc. H$_2$O. The blue voluminous precipitate, after filtering and drying, amounts to 4.79 g., and consists of a mixture of Hg[FeCo$_3$(CO)$_{12}$]$_2$ and a little Hg$_2$Cl$_2$.

*Example 6*

3.33 g. Co$_2$(CO)$_8$, 34.5 g. cobalt(II)2-ethylhexanoate containing 17.25% cobalt, 6 cc. Fe(CO)$_5$ and 200 cc. methylethylketone, are introduced under nitrogen in a 457 cc. shaking stainless steel autoclave. The carbon monoxide is then compressed up to 13 atm. and the hydrogen up to 121 atm. Within a period of 4 hours at 30° C. the pressure decreases to 95 atm.

The pressure at the end of the reaction is 94 atm. The gases are removed and the red-brown liquid contained in the autoclave is pured, under nitrogen, into a flask. After evaporating most of the solvent, the syrupy residue is treated with 200 cc. NH$_3$ 4 N. The violet precipitate which is obtained consists of

[Co(NH$_3$)$_6$][FeCo$_3$(CO)$_{12}$]$_2$.

This product, after filtering and drying under vacuum, amounts to 10.25 g. The yield obtained is about 46% of the calculated.

It is within the purview of this invention to replace the acetone of Example 1 and the methylethylketone of Example 6 by any one or more of the following compounds: diphenyl ketone, phenyl-ethyl ketone, methyl or ethyl or phenyl acetate, carbonate or propionate, tetrahydrofurane dioxane, ethylene glycol diethyl-ether, methanol, ethanol, glycol, glycerol, methyl amine, di- and tri-methyl amines, pyridine, pyrollidine, piperidine, acetamide, N-ethyl acetamide, proprionamide, caproyl amide, succinic acid diamide, malonic acid diamide, acetonitrile, butyric acid nitrile, caproyl nitrile, etc.

We claim:

1. Metallocarbonyl compounds of the formula

R[FeCo$_3$(CO)$_{12}$]$_n$ wherein R is a cation and $n$ is the valence of R, the R cation being selected from the class consisting of H$^+$; Li$^+$; K$^+$; N(R')$_4^+$ in which R' is taken from the group consisting of alkyl, aryl, and hydrogen; Cu$^+$; Ag$^+$; Au$^+$; Tl$^+$; Co(C$_5$H$_5$)$_2^+$ (where C$_5$H$_5$=cyclopentadienyl); Mg$^{++}$; Ca$^{++}$; Ba$^{++}$; Sr$^{++}$; Zn$^{++}$; Cd$^{++}$; Pb$^{++}$; Sn$^{++}$; Mn$^{++}$; Fe$^{++}$; Co$^{++}$; Ni$^{++}$; Ti$^{++}$; UO$_2^{++}$; Tl$^{+++}$; Cr$^{+++}$; Hg$^{++}$; and complexed compound cations of the foregoing which are basic according to Lewis classification.

2. The compounds of claim 1, the R cation being taken from the class consisting of H$^+$; Li$^+$; Na$^+$; K$^+$; (N(R')$_4^+$ in which R' is taken from the group consisting of alkyl, aryl, and hydrogen; Cu$^+$; Ag$^+$; Au$^+$; Tl$^+$; Co(C$_5$H$_5$)$_2^+$ (where C$_5$H$_5$=cyclopentadienyl); Mg$^{++}$; Ca$^{++}$; Ba$^{++}$; Sr$^{++}$; Zn$^{++}$; Cd$^{++}$; Pb$^{++}$; Sn$^{++}$; Mn$^{++}$; Fe$^{++}$; Co$^{++}$; Ni$^{++}$; Ti$^{++}$; UO$_2^{++}$; Tl$^{+++}$; Cr$^{+++}$; Hg$^{++}$; and complexed compound cations of the foregoing which are basic according to Lewis classification.

3. Mixed metallocarbonyl compounds according to claim 1, wherein R is a complex cation of the type [X(B')$_y$]$^{+m}$, X is a cationic substituent, $m$ is the valence of X, B is a basic substance according to Lewis selected from the group consisting of ketones, esters, ethers, alcohols, amines, amides, and nitrates, and $y$ is a number not higher than 6.

4. The compound having the formula HFeCo$_3$(CO)$_{12}$.

5. The compound having the formula

N(C$_2$H$_5$)$_4$[FeCo$_3$(CO)$_{12}$]$_2$

6. The compound having the formula

Hg[FeCo$_3$(CO)$_{12}$]$_2$

7. Compounds of the formula

[Co(B')$_y$][FeCo$_3$(CO)$_{12}$]$_2$ where B' is a compound selected from the group consisting of aliphatic ketones, amines and ammonia and $y$ is a number not higher than 6.

8. Compounds having the formula

[K(CH$_3$COCH$_3$)$_{1.5}$][FeCo$_3$(CO)$_{12}$]

9. A process of making the compound of the formula HFeCo$_3$(CO)$_{12}$, comprising treating the compound

[Co(CH$_3$COCH$_3$)$_6$][FeCo$_3$(CO)$_{12}$]$_2$ with hydrochloric acid.

10. A process of making the compound of the formula $HFeCo_3(CO)_{12}$, comprising treating the compound $$[Co(CH_3COCH_3)_6][FeCo_3(CO)_{12}]_2$$

with a strong acid.

11. A process of making the compound of the formula $HFeCo_3(CO)_{12}$, comprising reacting $Co_2(CO)_8$ with $Fe(CO)_5$ and acetone, to prepare $$[Co(CH_3COCH_3)_6][FeCo_3(CO)_{12}]_2$$

and treating the latter with a strong acid.

12. The process of claim 11, the acid being hydrochloric acid.

13. A process of making $[N(C_2H_5)_4][FeCo_3(CO)_{12}]$, comprising treating the compound $$[Co(CH_3COCH_3)_6][FeCo_3(CO)_{12}]_2$$

with $(C_2H_5)NI$ in water.

14. A process of making $[N(C_2H_5)_4][FeCo_3(CO)_{12}]$, comprising reacting $Co_2(CO)_8$ with $Fe(CO)_5$ and acetone, to prepare $[Co(CH_3COCH_3)_6][FeCo_3(CO)_{12}]_2$, and treating the latter with a tetraethylammonium salt of a strong mineral acid, in water.

15. The process of claim 14, the said salt being the iodide.

16. A process of making $Hg[FeCo_3(CO)_{12}]_2$, comprising treating the compound $$[Co(CH_3COCH_3)_6][FeCo_3(CO)_{12}]_2$$

with a mercuric salt of a strong mineral acid.

17. The process of claim 16, the salt being $HgCl_2$.

18. A process of making $$[K(CH_3COCH_3)_{1.5}][FeCo_3(CO)_{12}]$$

comprising reacting $[Co(CH_3COCH_3)_6][FeCo_3(CO)_{12}]_2$ with $CH_3COOK$ in water.

19. A process of making a compound of the formula $R[FeCo_3(CO)_{12}]_n$, comprising treating the compound $[Co(CH_3COCH_3)_6][FeCo_3(CO)_{12}]_2$ with a compound of the formula RX, in which X is the anion of a strong acid, in water.

20. The process of claim 19, the X anion being a halogen.

21. A metallocarbonyl compound containing the anion: $[FeCo_3(CO)_{12}]$.

References Cited
UNITED STATES PATENTS

| | | | |
|---|---|---|---|
| 2,849,471 | 8/1958 | Thomas | 260—439 |
| 2,942,936 | 6/1960 | Coffield | 23—14 |
| 2,967,087 | 1/1961 | Coffield | 23—14 |
| 2,968,665 | 1/1961 | Mahler | 260—439 |
| 3,096,266 | 7/1963 | Hubel et al. | 204—158 |
| 3,188,335 | 6/1965 | Hubel | 260—439 |

CARL D. QUARFORTH, *Primary Examiner.*

MAURICE A. BRINDISI, BENJAMIN R. PADGETT,
*Examiners.*

M. N. MELLER, L. A. SEBASTIAN,
*Assistant Examiners.*